(12) United States Patent
Nakano

(10) Patent No.: US 10,006,499 B2
(45) Date of Patent: Jun. 26, 2018

(54) MULTIPLATE CLUTCH

(71) Applicant: HONDA MOTOR CO., LTD., Tokyo (JP)

(72) Inventor: Kenichi Nakano, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 351 days.

(21) Appl. No.: 14/834,672

(22) Filed: Aug. 25, 2015

(65) Prior Publication Data

US 2016/0091031 A1   Mar. 31, 2016

(30) Foreign Application Priority Data

Sep. 25, 2014   (JP) .................................. 2014-195041

(51) Int. Cl.
*F16D 13/74* (2006.01)
*F16D 13/52* (2006.01)

(52) U.S. Cl.
CPC ............. *F16D 13/74* (2013.01); *F16D 13/52* (2013.01); *F16D 2300/0214* (2013.01)

(58) Field of Classification Search
None
See application file for complete search history.

(56) References Cited

U.S. PATENT DOCUMENTS

| 2011/0192699 A1 | 8/2011 | Yazaki et al. |
| 2015/0041275 A1* | 2/2015 | Satou ............ F16D 13/56 192/66.31 |

FOREIGN PATENT DOCUMENTS

| JP | S54178351 U | 12/1979 |
| JP | S5628321 A | 3/1981 |
| JP | 10-274256 A | 10/1998 |
| JP | H1182537 A | 3/1999 |

* cited by examiner

*Primary Examiner* — Colby M Hansen
(74) *Attorney, Agent, or Firm* — Squire Patton Boggs (US) LLP

(57) ABSTRACT

A pressure disk includes spring receiving portions for mounting coil springs that are elastically installed between the pressure disk and a clutch center. The spring receiving portions are aligned circumferentially on the outside in a radial direction with respect to an oil take-in hole. The spring receiving portions are provided with a supply hole in a side surface portion thereof toward the inside of the pressure disk. The supply hole introduces the oil supplied from the oil take-in hole. The spring receiving portion includes a discharge hole which discharges to the outside the oil introduced in the spring receiving portion. An inside cylindrical portion of the clutch center includes communication holes communicating with the outside.

10 Claims, 7 Drawing Sheets

MULTIPLATE CLUTCH

BACKGROUND

Field

The present invention relates to a multiplate clutch.

Description of the Related Art

As the related art, a multiplate clutch is disclosed in which oil is scraped up by an outer peripheral portion of a clutch housing, thereby supplying the oil to clutch plates and cooling them (for example, see JP-A No. Hei 10-274256 (Patent Literature 1)). According to Patent Literature 1, oil take-in holes for supplying oil to the clutch plates are provided in a pressure disk.

However, in the above-described related art multiplate clutch, the oil having entered the inside surface side of the pressure disk through the oil take-in holes flows outward in the radial direction immediately by centrifugal force. Therefore, while oil is easily supplied to the clutch plate disposed on the outside in the axial direction of the multiplate clutch, oil is not easily supplied to the clutch plate disposed on the inside in the axial direction of the multiplate clutch.

SUMMARY

Accordingly, the present invention has been made in view of the above circumstances, and an object of the present invention is to provide a multiplate clutch in which oil can be also efficiently supplied to the clutch plate located on the inside in the axial direction.

In order to accomplish the above-mentioned object, an embodiment of the present invention provides a multiplate clutch in which a frictional clutch plate is engaged/disengaged by a pressure disk, the pressure disk can have an oil take-in hole. The clutch plate can be supplied with oil supplied to an inside surface side of the pressure disk through the oil take-in hole. The pressure disk is formed with a plurality of spring receiving portions for mounting coil springs that are elastically installed between the pressure disk and a clutch center, the spring receiving portions being aligned circumferentially on the outside in a radial direction with respect to the oil take-in hole. Each of the spring receiving portions is provided with a supply hole in a side surface portion thereof toward the inside in the radial direction of the pressure disk, the supply hole introducing into the spring receiving portion the oil supplied from the oil take-in hole. The spring receiving portion is formed with a discharge hole in a leading end portion thereof toward the outside in the radial direction of the pressure disk, the discharge hole discharging to the outside the oil introduced in the spring receiving portion. A side surface portion of the clutch center is formed with communication holes communicating with the inside in the radial direction.

According to embodiments of the present invention, each of the plurality of spring receiving portions aligned circumferentially on the outside in the radial direction with respect to the oil take-in hole is provided with the supply hole in a side surface portion thereof toward the inside in the radial direction of the pressure disk, the supply hole introducing into the spring receiving portion the oil supplied from the oil take-in hole. Also, the spring receiving portion is formed with the discharge hole in a leading end portion thereof toward the outside in the radial direction of the pressure disk, the discharge hole discharging to the outside the oil introduced in the spring receiving portion. Thus, the oil supplied to the inside surface side of the pressure disk through the oil take-in hole is moved outward in the radial direction by centrifugal force. Part of the oil enters the inside of the spring receiving portion through the supply hole and flows outwardly in the radial direction from the discharge hole in the leading end portion of the spring receiving portion, and passes through the communication holes of the clutch center into the clutch plate located on the inside in the axial direction of the multiplate clutch. It is therefore possible to efficiently supply the oil to the clutch plate located on the inside in the axial direction.

In certain embodiments, the leading end of the spring receiving portion is formed with a seating face that receives a leading end portion of the coil spring, and the discharge hole is formed in the seating face.

According to certain embodiments, since the discharge hole is formed in the seating face on the leading end of the spring receiving portion, the oil is allowed to flow from the leading end side of the spring receiving portion, thereby allowing the efficient supply of the oil to the clutch plate located on the inside in the axial direction.

In some embodiments, the discharge hole is molded by a mold with a demolding direction coinciding with an axial direction.

Since the discharge hole is molded by a mold with the demolding direction coinciding with the axial direction, it is possible to easily form the discharge hole without the need for machining.

In certain embodiments, an edge portion of the discharge hole toward the outside in the axial direction of the multiplate clutch is disposed more inward in the axial direction of the multiplate clutch than an intermediate portion of thickness of the clutch plate. Since the edge portion of the discharge hole toward the outside in the axial direction of the multiplate clutch is disposed more inward in the axial direction of the multiplate clutch than the intermediate portion of the thickness of the clutch plate, it is possible to supply the oil from the discharge hole to the inner side in the axial direction of the multiplate clutch than the intermediate portion of the thickness of the clutch plate, thereby allowing the efficient supply of the oil to the clutch plate located on the inside in the axial direction.

Additionally, a width of the supply hole can be larger than a width of a gap between the adjacent spring receiving portions. Since the width of the supply hole is larger than the width of the gap between the adjacent spring receiving portions, it is possible to efficiently introduce the oil into the spring receiving portion through the supply hole.

With the multiplate clutch according to embodiments of the present invention, it is possible to efficiently supply oil to the clutch plate located on the inside in the axial direction.

Furthermore, it is possible to efficiently supply oil from the leading end side of the spring receiving portion to the clutch plate located on the inside in the axial direction.

Moreover, it is possible to easily form the discharge hole without the need for machining.

Further, it is possible to supply oil from the discharge hole to the inner side in the axial direction of the multiplate clutch than the intermediate portion of the thickness of the clutch plate.

Additionally, the width of the supply hole is larger, thereby allowing the efficient introduction of oil into the spring receiving portion.

DETAILED DESCRIPTION

Figure 1:
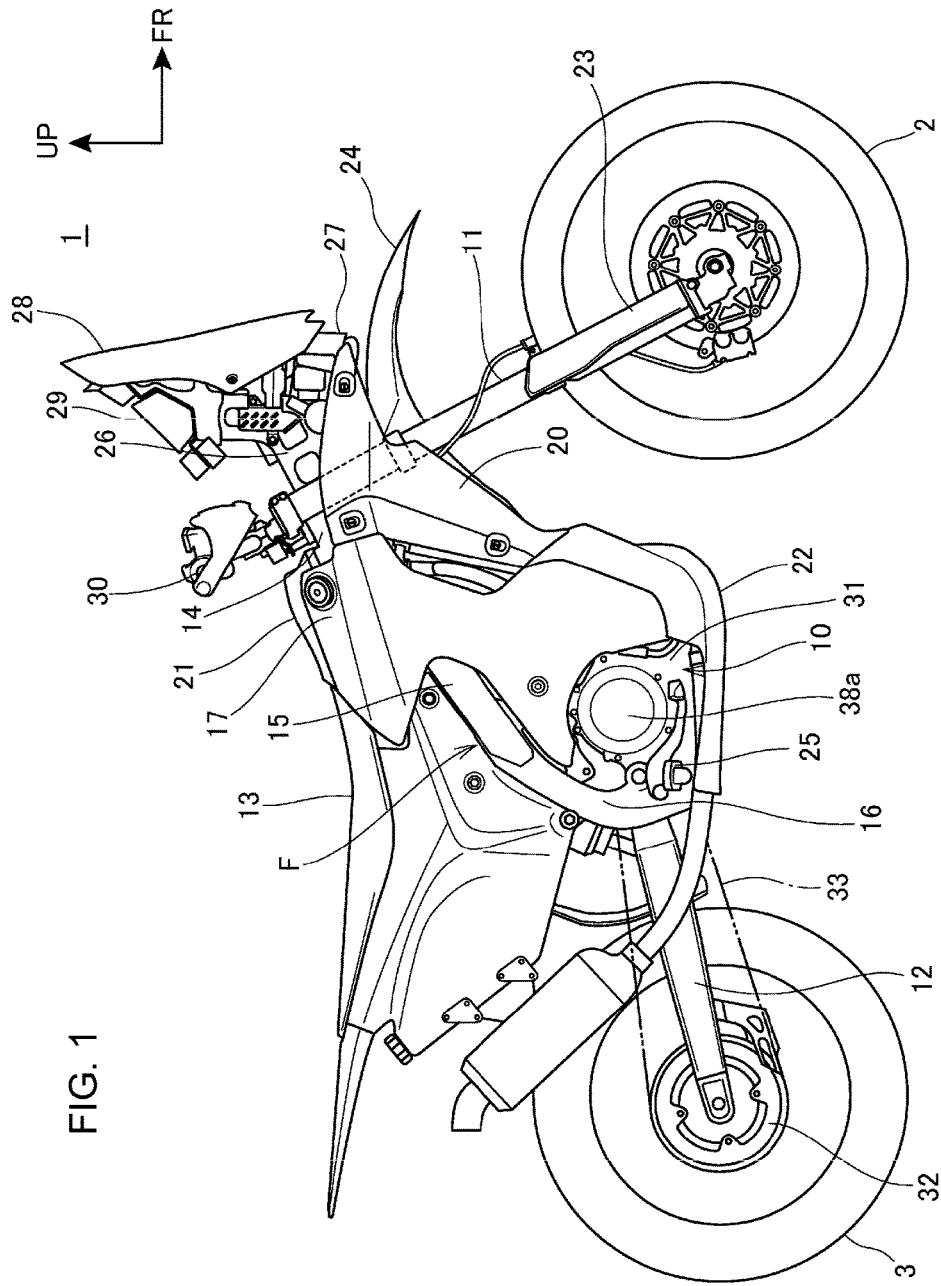
FIG. 1 is a right side view of a motorcycle according to an embodiment of the present invention.

Hereinafter, embodiments of the present invention will be described with reference to the accompanying drawings. It is to be noted that, throughout the description, references to directions, such as front, rear, left, right, top, and bottom, are made with reference to a vehicle body, unless otherwise stated. It is also to be noted that, in the drawings, reference sign FR denotes the front of the vehicle body, reference sign UP denotes the upper side of the vehicle body, and reference sign LH denotes the left of the vehicle body.

FIG. 1 is a right side view of a motorcycle 1 according to an embodiment of the present invention. It should be noted that, in FIG. 1, as for the elements described as a left-and-right pair, only the right-hand one is shown.

The motorcycle 1 in this example is a vehicle in which an engine 10 serving as a power unit is supported by a body frame F. A pair of left and right front forks 11 supporting a front wheel 2 are steerably supported at a front end of the body frame F. A swing arm 12 supporting a rear wheel 3 is provided at a rear portion of the body frame F. The motorcycle 1 is a saddle-ride type vehicle in which a seat 13 astride which an occupant is to sit is provided above the longitudinal center of the body frame F.

The body frame F is provided with a head pipe 14 provided at a front end, and a pair of left and right main frames 15 that are inclined to extend obliquely downward to the rear from the head pipe 14. A pair of left and right pivot frames 16 extend downwardly from rear ends of the main frames 15. A down frame (not shown) extends rearwardly and downwardly from the rear face of a lower portion of the head pipe 14. An under frame (not shown) branches into left and right from the down frame to extend downward, and then bends almost horizontally to the rear to be coupled to lower ends of the pivot frames 16.

A fuel tank 17 is disposed forward of the seat 13 and extends vertically on left and right lateral sides of the main frames 15.

The motorcycle 1 is provided with a resin body cover. The body cover is provided with a pair of left and right shrouds 20 for covering upper portions of the front forks 11 and the down frame from lateral sides. A tank cover 21 is provided, for covering the fuel tank 17 from above. An undercover 22 covers the under frame and the engine 10 from below, and a pair of left and right fork covers 23 for covering lower portions of the front forks 11.

A front fender 24 for covering the front wheel 2 from above is fixed to the front forks 11.

A pair of left and right steps 25 on which an occupant is to place his/her feet are provided at lower ends of the pivot frames 16. A front stay 26 protruding forward is fixed to a front portion of the head pipe 14, and a headlight 27, a plate-like wind screen 28 and meters 29 are supported on the front stay 26.

A handlebar 30 that an occupant uses for steering the front wheel 2 is provided above the front forks 11.

The power of the engine 10 is transmitted to the rear wheel 3 through a driving chain 33, the driving chain 33 being stretched between a drive sprocket (not shown) provided on the left side surface of a rear portion of a crankcase 31 of the engine 10 and a driven sprocket 32 provided on the rear wheel 3.

Figure 2:
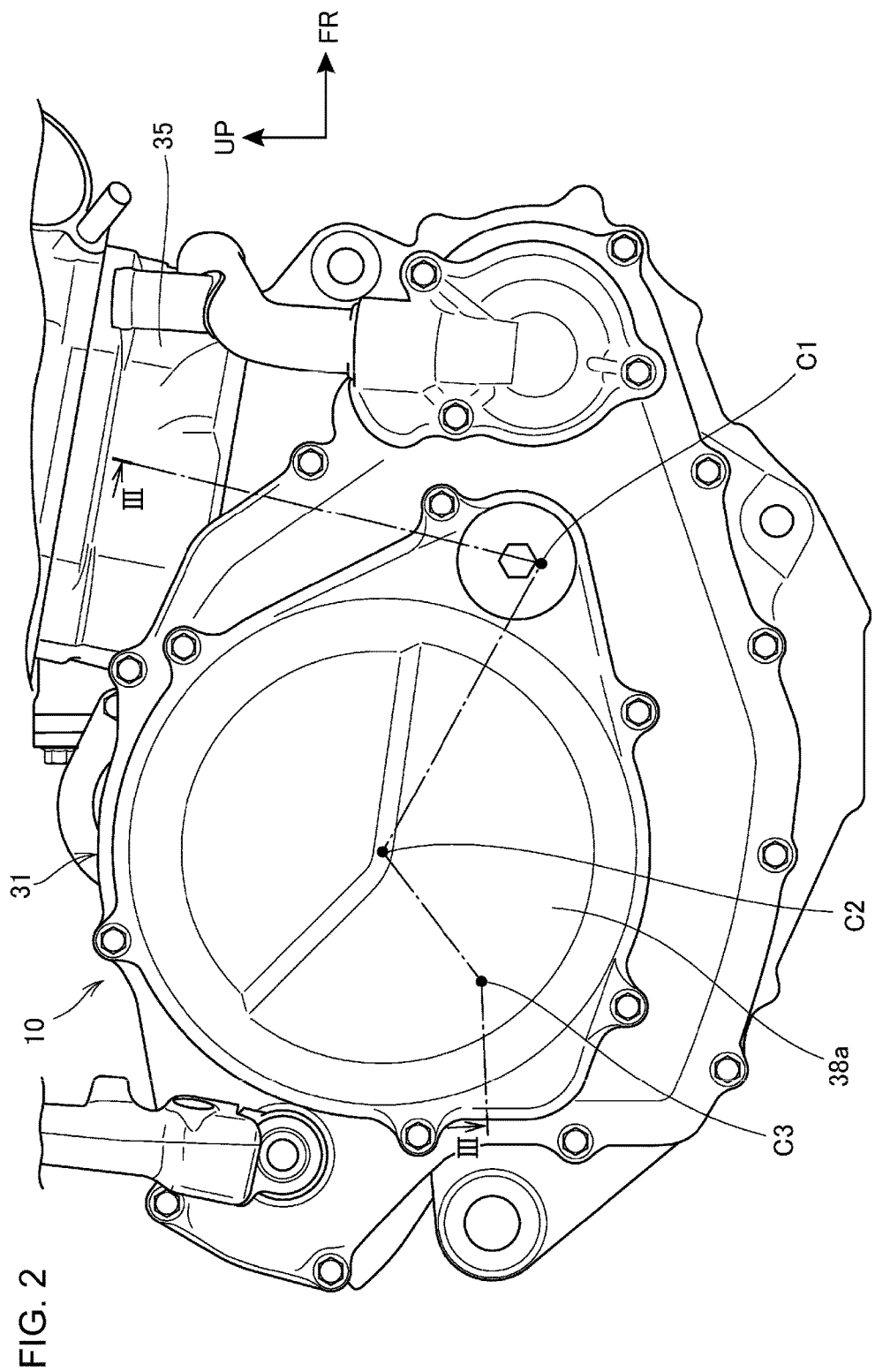
FIG. 2 is a right side view of a lower portion of an engine.
Figure 3:
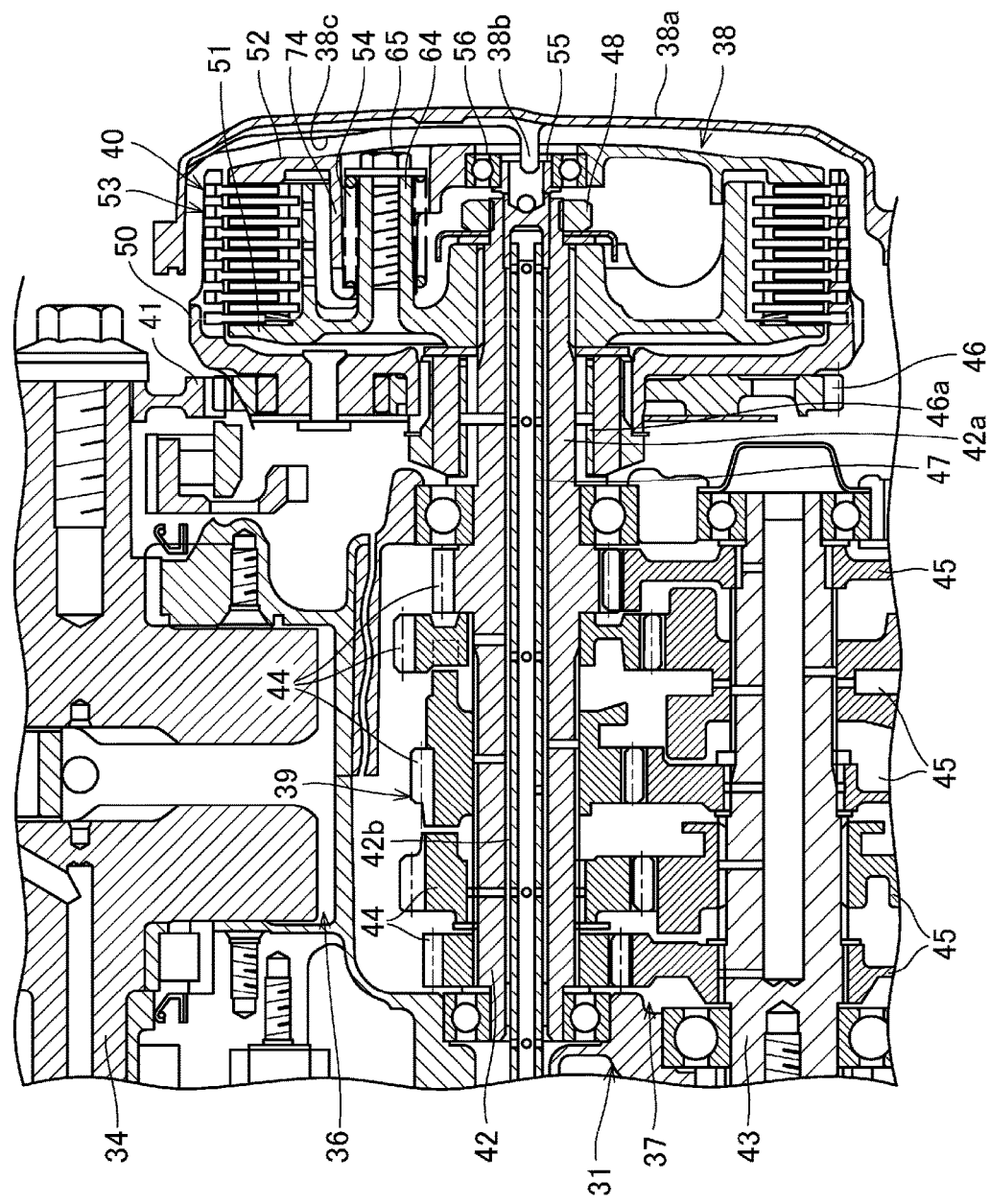
FIG. 3 is a sectional view taken along line III-III of FIG. 2.

FIG. 2 is a right side view of a lower portion of the engine 10. FIG. 3 is a sectional view taken along line III-III of FIG. 2.

The engine 10 is provided with the crankcase 31 that supports a crankshaft 34 extending horizontally in the vehicle width direction, and a cylinder portion 35 that extends upwardly from the top of a front portion of the crankcase 31.

The crankcase 31 is provided with a crank chamber 36 that is located at a front portion thereof for housing the crankshaft 34, and a transmission chamber 37 that is provided at a rear portion of the crankcase 31. A clutch chamber 38 is disposed on the right side of the transmission chamber 37. The right side surface of the clutch chamber 38 is configured by a clutch cover 38a fixed to on a side surface of the crankcase 31.

A transmission 39 is housed in the transmission chamber 37, and a multiple clutch 40 for transmitting the power of the crankshaft 34 to the transmission 39 is housed in the clutch chamber 38.

The crankshaft 34 is provided with a primary drive gear 41 at the shaft end thereof toward the clutch chamber 38.

The transmission 39 shifts the rotation transmitted from the multiplate clutch 40 to output it to the rear wheel 3 side. The transmission 39 is provided with a main shaft 42 serving as an input shaft, and a countershaft 43, serving as an output shaft, disposed parallel to the main shaft 42. A plurality of driving gears 44 are provided on the main shaft 42, and a plurality of driven gears 45 are provided on the countershaft 43 and meshing with the driving gears 44. The transmission 39 is, in this embodiment, a constant mesh gear transmission. The drive sprocket is fixed to a shaft end of the countershaft 43.

As shown in FIG. 2, the shaft axis C1 of the crankshaft 34 is located at a front portion of the crankcase 31, the shaft axis C2 of the main shaft 42 is located above and behind the shaft axis C1, and the shaft axis C3 of the countershaft 43 is located behind the shaft axis C2 and, in the vertical direction, located between the shaft axis C1 and the shaft axis C2. The shaft axis C2 coincides with the shaft axis of the multiplate clutch 40. The shaft axes C1, C2, and C3 are parallel to one another.

The transmission 39 is provided with a shift drum (not shown) that is rotated by a rider or the operation of an actuator, and a plurality of shift forks (not shown) that slide in the axial direction of the main shaft 42 and the countershaft 43 along a groove in an outer peripheral portion of the shift drum. Each of the shift forks is coupled to the predetermined driving gear 44 and driven gear 45, and the shift drum is rotated to axially slide the driving gear 44 and the driven gear 45, thereby shifting gears.

The transmission 39 allows the power transmission between the main shaft 42 and the countershaft 43, which selectively uses either the neutral position or any one shift gear pair of the first to fifth gears in accordance with the sliding of the driving gears 44 and the driven gears 45.

The main shaft 42 is provided with a clutch supporting shaft portion 42a protruding into the clutch chamber 38.

A primary driven gear 46 meshing with the primary drive gear 41 is journaled to the clutch supporting shaft portion 42a through a bearing 46a. The primary driven gear 46 is rotatable on the clutch supporting shaft portion 42a.

The main shaft 42 is provided with a hollow portion 42b over the entire length in the shaft center thereof, and a pushrod 47 capable of moving in the axial direction is disposed in the hollow portion 42b. The pushrod 47 has one end connected to an operating portion (not shown) of the multiplate clutch 40, which is operated by a rider, and the other end connected to the multiplate clutch 40. The operating portion is, for example, a clutch lever provided on the handlebar 30. When a rider operates the clutch lever and moves the pushrod 47 in the axial direction, the multiplate clutch 40 is disengaged/engaged.

The multiplate clutch 40 is provided at a shaft end of the clutch supporting shaft portion 42a. When the multiplate clutch 40 is engaged, the rotation of the primary driven gear 46 driven by the crankshaft 34 is transmitted to the main shaft 42 through the multiplate clutch 40. On the other hand, when the multiplate clutch 40 is disengaged, the primary driven gear 46 driven by the crankshaft 34 turns free on the clutch supporting shaft portion 42a, so that the rotation of the crankshaft 34 is not transmitted to the main shaft 42.

The clutch cover 38a is provided with an oil supply piece 38b protruding toward the multiplate clutch 40 at a position overlapping the main shaft 42 as viewed from a side view. The clutch cover 38a is also provided with a rib 38c extending from a peripheral edge portion of the inner surface thereof to the oil supply piece 38b. The oil supplied from an oil supply portion (not shown) flows through the rib 38c to the oil supply piece 38b, and is supplied to the inside of the multiplate clutch 40 from the oil supply piece 38b.

Figure 4:
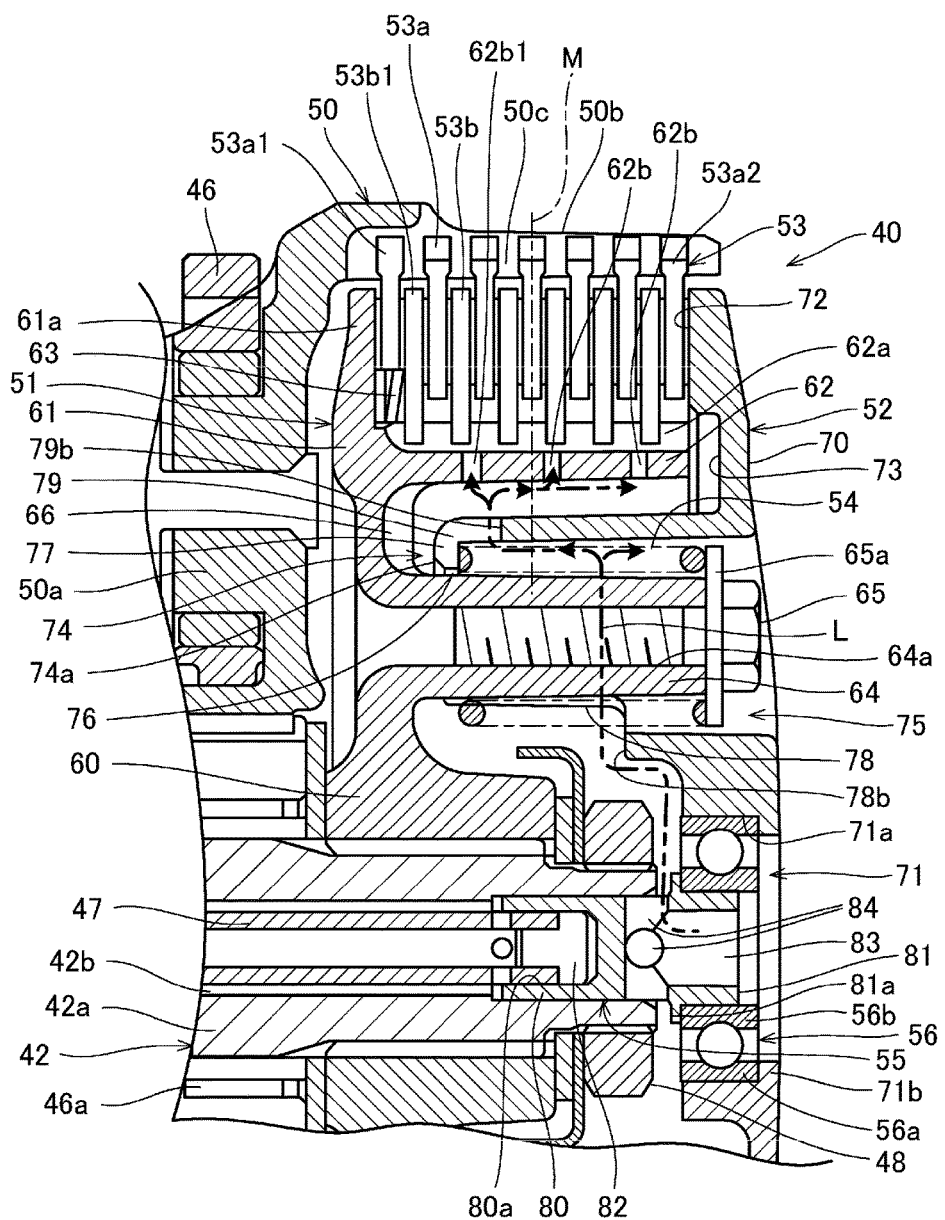
FIG. 4 is a view showing the essential parts of FIG. 3.

FIG. 4 is a view showing the essential parts of FIG. 3.

The multiplate clutch 40 is provided with a cup-shaped clutch outer 50 that is fixed to a side surface of the primary driven gear 46. A clutch center 51 is provided on the inside in the radial direction of the clutch outer 50 and integrally fixed to the main shaft 42, and a pressure disk 52 is disposed to face the clutch center 51 and movable in the axial direction of the main shaft 42. The multiplate clutch 40 is also provided with a clutch plate 53 that is held between the pressure disk 52 and the clutch center 51, and a plurality of coil springs 54 that bias the pressure disk 52 to reduce the distance between the pressure disk 52 and the clutch center 51. A connecting member 55 connects the pushrod 47 and the pressure disk 52, and a bearing 56 is provided between the connecting member 55 and the pressure disk 52.

The clutch plate 53 is provided with ring-shaped outside friction plates 53a supported by the clutch outer 50, and ring-shaped inside friction plates 53b supported by the clutch center 51. The alternating outside friction plates 53a and inside friction plates 53b are arranged so as to overlap each other between the clutch center 51 and the pressure disk 52.

The clutch outer 50 can rotate relative to the main shaft 42 integrally with the primary driven gear 46.

The clutch outer 50 is provided with a disk portion 50a that is integrally fixed to an outside surface of the primary driven gear 46, and an outside cylindrical portion 50b that extends from a peripheral edge portion of the disk portion 50a, in approximately coaxial positional relation to the main shaft 42. The outside cylindrical portion 50b is circumferentially formed with a plurality of axially-extending slit-like clutch fitting portions 50c.

The outside friction plates 53a are arranged on the inside of the clutch outer 50, and provided in such a manner that, with protrusions on the outer periphery thereof splined to the clutch fitting portions 50c, the outside friction plates 53a can move in the axial direction of the clutch outer 50 and cannot rotate relative to the clutch outer 50.

Figure 5:
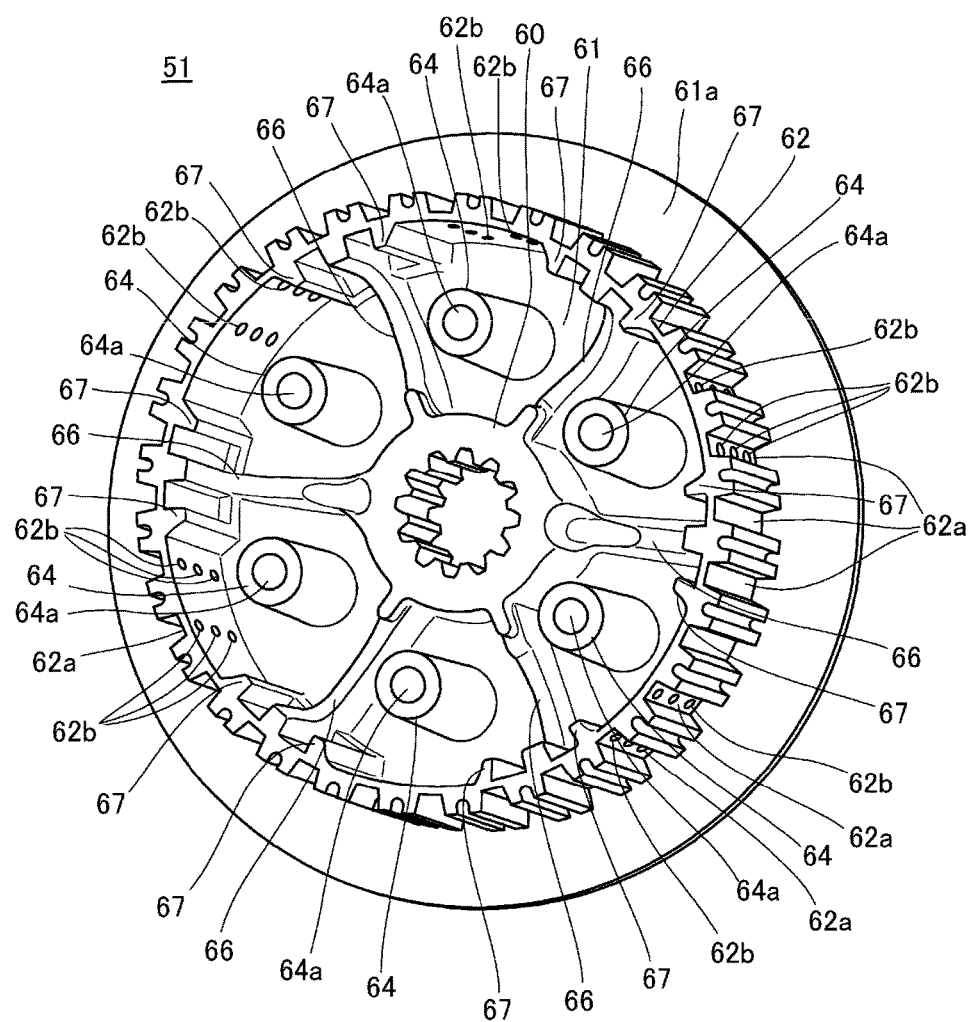
FIG. 5 is a perspective view of a clutch center as viewed from a pressure disk side.

FIG. 5 is a perspective view of the clutch center 51 as viewed from the pressure disk 52 side.

As shown in FIGS. 4 and 5, the clutch center 51 is provided with a cylindrical hub portion 60 that is fixed to the main shaft 42. A disk-shaped receiving plate portion 61 extends outwardly in the radial direction from an outer peripheral portion of the hub portion 60 to the vicinity of the inner peripheral surface of the clutch outer 50. An inside cylindrical portion 62 (a side surface portion of the clutch center 51) is located more inward than the outer periphery of the receiving plate portion 61 and extends toward the pressure disk 52 approximately coaxially with the main shaft 42.

The clutch center 51 is axially positioned by a nut 48 axially pressing the hub portion 60, with the hub portion 60 splined to the clutch supporting shaft portion 42a. That is, the clutch center 51 is fixed in the rotational direction and in the axial direction with respect to the main shaft 42, and rotates integrally with the main shaft 42.

The outer periphery of the inside cylindrical portion 62 is circumferentially formed with a plurality of axially-extending groove-like clutch fitting portions 62a.

The inside friction plates 53b are arranged so that the inner periphery thereof is fitted to the outer periphery of the inside cylindrical portion 62, and provided in such a manner that, with protrusions on the inner periphery thereof splined to the clutch fitting portions 62a, the inside friction plates 53b can move in the axial direction of the clutch center 51 and cannot rotate relative to the clutch center 51.

The inside cylindrical portion 62 is formed with a plurality of communication holes 62b that provide communication in the radial direction between the inside and outside of the inside cylindrical portion 62. The communication holes 62b are arranged in a plurality of rows in the axial direction of the inside cylindrical portion 62, and provided in two rows in the circumferential direction.

The receiving plate portion 61 of the clutch center 51 is provided with an annular pressure receiving portion 61a outside the inside cylindrical portion 62 for axially receiving the clutch plate 53. The pressure receiving portion 61a abuts on the innermost clutch plate 53 in the axial direction of the multiplate clutch 40, that is, on the innermost outside friction plate 53a1. The outside friction plate 53a1 is formed to have a smaller inner diameter than the other outside friction plates 53a, and a ring-shaped judder spring 63 is provided inside the outside friction plate 53a1. The judder spring 63 is a disc spring which is held between the pressure receiving portion 61a and the innermost inside friction plate 53b1, and biases the clutch plate 53 toward the pressure disk 52 with the inside friction plate 53b1 interposed therebetween.

The clutch center 51 is provided with a plurality of cylindrical boss portions 64 that are arranged upright toward the pressure disk 52 from the receiving plate portion 61. The boss portions 64 are located between the hub portion 60 and the inside cylindrical portion 62 in the radial direction, and arranged at approximately equally spaced intervals in the circumferential direction. The tips of the boss portions 64 extend outwardly beyond the leading end of the inside cylindrical portion 62.

The coil springs 54 are mounted to the boss portions 64 such that the inner periphery thereof is fitted to the outer periphery of the boss portions 64.

Each of the boss portions 64 is provided with an internally threaded portion 64a in the inner periphery thereof, and a washer 65a for supporting the coil spring 54 is fixed to the boss portion 64 by a bolt 65 fastened to the internally threaded portion 64a. The diameter of the washer 65a is formed larger than the outer diameter of the boss portion 64, and one end of the coil spring 54 is supported by the washer 65a. That is, the washer 65a constitutes an outside seat that receives an end on the outside in the axial direction of the coil spring 54.

Ribs 66 for connecting the boss portions 64 and the inside cylindrical portion 62 are radially formed among the boss portions 64.

The communication holes 62b are arranged outside the boss portions 64 in the radial direction of the clutch center 51. More specifically, when the inside cylindrical portion 62 is viewed from the outside in the radial direction, the communication holes 62b are located at positions substantially overlapping the boss portions 64 or in the vicinity of the boss portions 64. Furthermore, the communication holes 62b, when viewed in the radial direction, are arranged at positions overlapping spring receiving portions 74 to be described later.

On the inner periphery of the inside cylindrical portion 62, partition ribs 67 are formed so as to sandwich from both sides in the circumferential direction a group of the communication holes 62b provided corresponding to the position of each boss portion 64. The partition ribs 67 extend axially over the entire length of the inside cylindrical portion 62.

Figure 6:
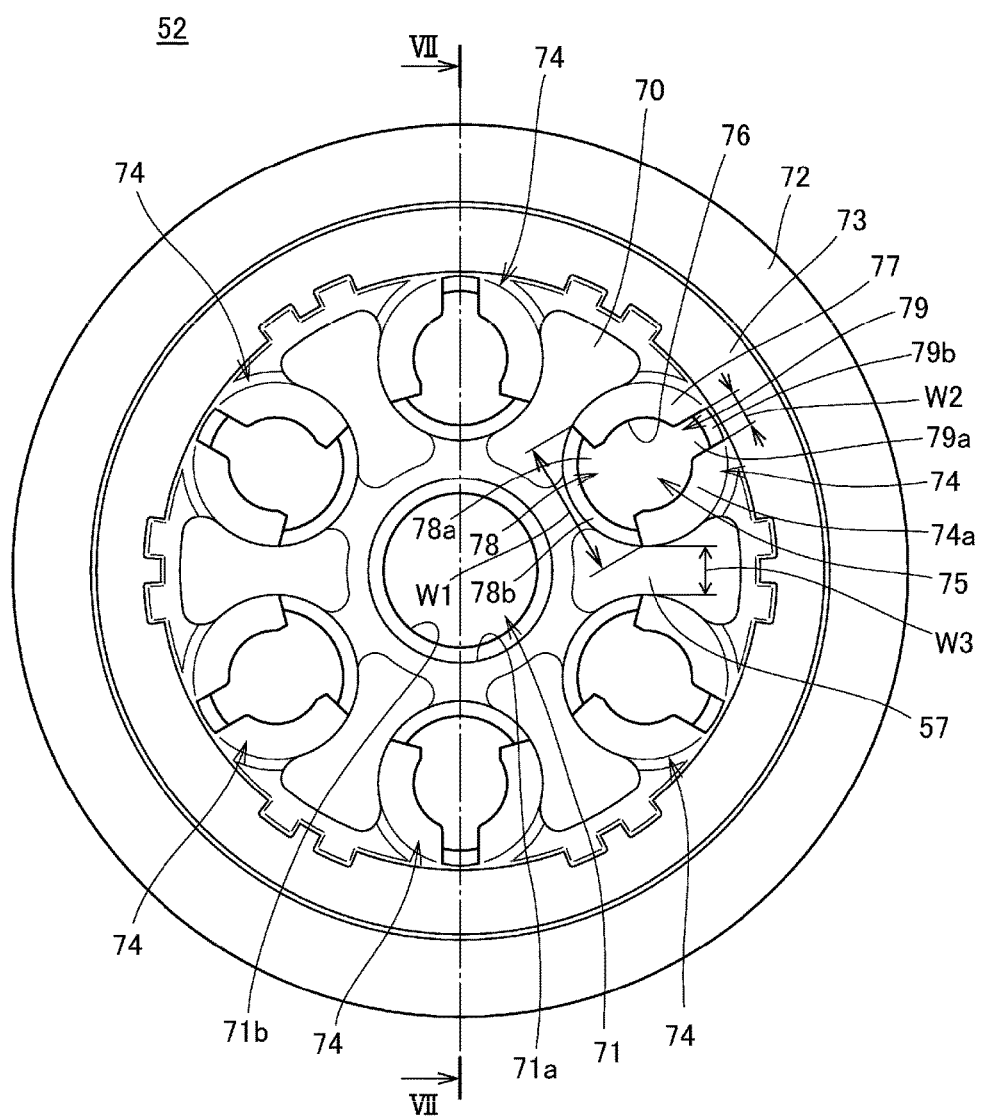
FIG. 6 is a view of the pressure disk as viewed from the clutch center side.
Figure 7:
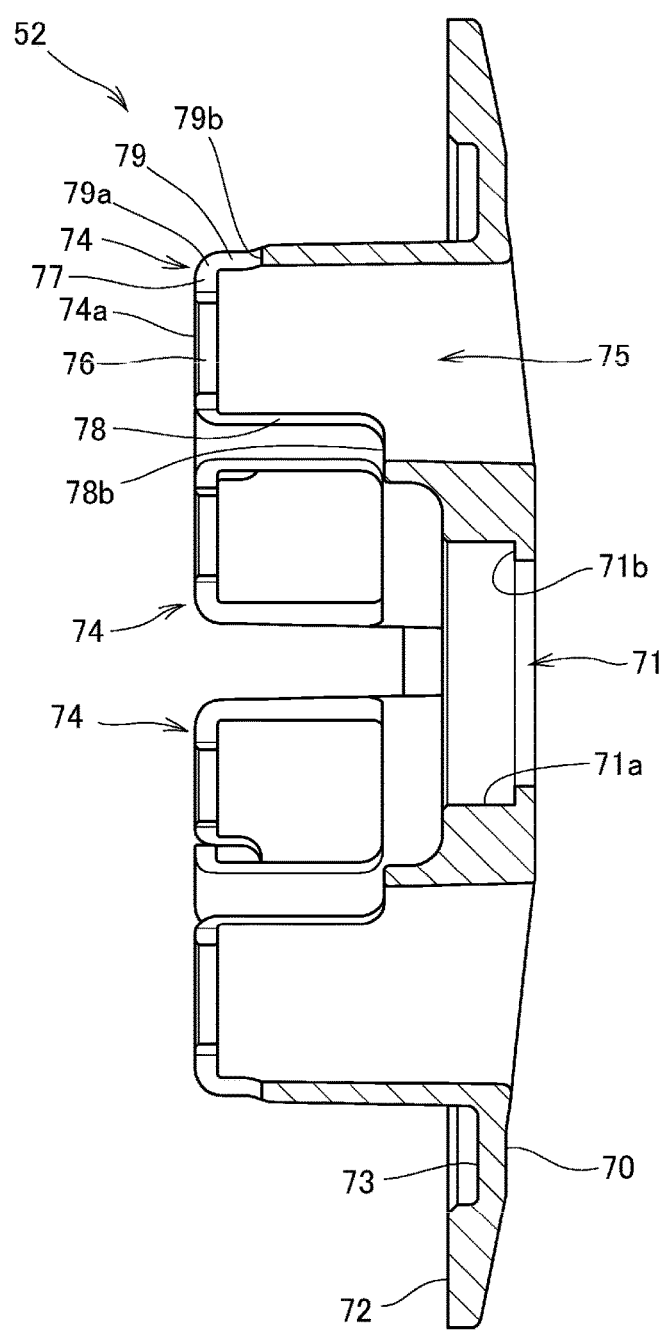
FIG. 7 is a sectional view taken along line VII-VII of FIG. 6.

FIG. 6 is a view of the pressure disk 52 as viewed from the clutch center 51 side. FIG. 7 is a sectional view taken along line VII-VII of FIG. 6. It should be noted that in FIG. 6, reference signs for denoting detailed portions of the spring receiving portions 74 to be described later are shown only for the spring receiving portion 74 in one place.

As shown in FIGS. 4, 6, and 7, the pressure disk 52 includes a disk-shaped plate portion 70 that is disposed more outward in the axial direction of the multiplate clutch 40 than the receiving plate portion 61 so as to face the receiving plate portion 61 of the clutch center 51, and a circular oil take-in hole 71 that is provided in the center of the plate portion 70. The oil take-in hole 71 is provided with a bearing supporting hole portion 71a for fitting the bearing 56, and a flange portion 71b protruding inward in the radial direction from an outer end portion thereof. The oil supplied from the oil supply piece 38b passes through the oil take-in hole 71 and is taken into the inside surface side of the pressure disk 52.

On an outer peripheral edge portion on the inside surface of the plate portion 70, there is formed a pressing portion 72 that abuts on the clutch plate 53 on the outermost side in the axial direction of the multiplate clutch 40, that is, on the outermost outside friction plate 53a2. The pressing portion 72 is annularly formed, and presses the outside friction plate 53a2 with the biasing force of the coil springs 54.

The pressing portion 72 is formed to have a further increased thickness, the inner periphery of which is formed with an annular groove portion 73.

The pressure disk 52 is provided with a plurality of cylindrical spring receiving portions 74 that are arranged upright toward the clutch center 51 from the inside surface of the plate portion 70. The spring receiving portions 74 are located between the oil take-in hole 71 and the groove portion 73 in the radial direction of the pressure disk 52, and arranged at approximately equally spaced intervals in the circumferential direction so as to correspond to the position of the boss portions 64.

Within each of the spring receiving portions 74 formed in a hollow shape, there is formed a spring housing portion 75 that is a column-shaped space having a diameter larger than the outer diameter of the coil spring 54. The coil spring 54 and the washer 65a of the bolt 65 mounted to the boss portion 64 are housed in the spring housing portion 75.

The end of the spring housing portion 75 toward the outside surface of the pressure disk 52 opens outward.

A leading end surface 74a of the spring receiving portion is formed with a boss insertion hole 76 into which the boss portion 64 is inserted. A peripheral edge portion of the boss insertion hole 76 constitutes a flange-shaped inside seat (seating face) 77 for receiving the other end of the coil spring 54.

A supply hole 78 communicating with the inside of the spring housing portion 75 is formed in the outer peripheral surface of the side surface portion of the spring receiving portion 74 toward the inside in the radial direction of the pressure disk 52. The oil supplied from the oil supply piece 38b (FIG. 3) passes through the supply hole 78 and is taken into the spring housing portion 75.

Furthermore, a discharge hole 79 communicating with the inside of the spring housing portion 75 is formed in the outer peripheral surface of the side surface portion of the spring receiving portion 74 toward the outside in the radial direction of the pressure disk 52. The oil in the spring housing portion 75 passes through the discharge hole 79 and is discharged to the outside in the radial direction of the pressure disc 52.

The supply hole 78, in the axial direction of the multiplate clutch 40, is formed continuously from a base end portion of the spring receiving portion 74 to the leading end of the spring receiving portion 74, the leading end thereof being connected to the boss insertion hole 76 by cutting out a portion of the inside seat 77. That is, the supply hole 78 is provided with a leading-end supply hole portion 78a formed by cutting out a portion of the leading end surface 74a. Furthermore, an edge portion 78b of the supply hole 78 toward the outside in the axial direction of the multiplate clutch 40 is located more outward than an intermediate portion in the axial direction of the spring receiving portion 74. More specifically, in the state where the clutch is engaged as shown in FIG. 4, the edge portion 78b is formed more outward in the axial direction of the multiplate clutch 40 than an intermediate portion M of the thickness of the clutch plate 53.

The supply hole 78 is formed to have an approximately equal width over its entire length. The width W1 of the supply hole 78 is formed in a range smaller than half the circumferential range of the spring receiving portion 74, that is, in a range smaller than 180°, when viewed in the axial direction of the spring receiving portion 74. Since the inside seat 77 has no continuous notch in the range of 180° or more as viewed in the axial direction, the coil spring 54 can be properly supported.

The discharge hole 79, in the axial direction of the multiplate clutch 40, is formed at a leading end portion of the spring receiving portion 74, the leading end thereof being connected to the boss insertion hole 76 by cutting out a portion of the inside seat 77. That is, the discharge hole 79 is provided with a leading-end discharge hole portion 79a formed by cutting out a portion of the leading end surface 74a. Furthermore, an edge portion 79b of the discharge hole 79 toward the outside in the axial direction of the multiplate clutch 40 is located more inward than an intermediate portion in the axial direction of the spring receiving portion 74. More specifically, in the state where the clutch is engaged as shown in FIG. 4, the edge portion 79b is formed more inward in the axial direction of the multiplate clutch 40 than the intermediate portion M of the thickness of the clutch plate 53. Further, the discharge hole 79 is disposed at almost the same position in the axial direction with respect to the communication hole 62b1 (FIG. 4) located on the innermost side in the axial direction of the multiplate clutch 40. The other communication holes 62b are arranged outward in the axial direction of the multiplate clutch 40 from the position of the communication hole 62b1.

The discharge hole 79 is formed to have an approximately equal width over its entire length. The width W2 of the discharge hole 79 is smaller than the width W1 of the supply hole 78, when viewed in the axial direction of the spring receiving portion 74. Furthermore, the width W1 of the supply hole 78 is larger than the width W3 of a gap 57 between the adjacent spring receiving portions 74. Moreover, the width W2 is smaller than the width W3.

An imaginary line (which is a line coincident with line VII-VII) passing the center of the pressure disk 52 and the center of each of the spring receiving portions 74 passes through the center in the width direction of the width W1 and the width W2.

The pressure disk 52 is manufactured by casting using an axially-opening mold (not shown) for the spring receiving portion 74. The outer periphery of the spring receiving portion 74 is formed with a draft tapered toward the leading end. The supply hole 78 and the discharge hole 79 are provided with the leading-end supply hole portion 78a and the leading-end discharge hole portion 79a, respectively, which open in the demolding direction, that is, in the axial direction. Therefore, the pressure disk 52 integrally having the supply hole 78 and the discharge hole 79 can be manufactured by the mold having a simple structure.

The bearing 56 is in this example a ball bearing, and fitted to the bearing supporting hole portion 71a of the pressure disk 52. The bearing 56 is axially positioned with the end face of an outer ring 56a abutting on the flange portion 71b.

The connecting member 55 is provided with a cylindrical main shaft fitting portion 80 that is fitted into the hollow portion 42b in the leading end of the clutch supporting shaft portion 42a of the main shaft 42, and a cylindrical pressure disk connecting portion 81 that protrudes outwardly from the main shaft 42 and is connected to the pressure disk 52 through the bearing 56.

The main shaft fitting portion 80 is provided with a pushrod fitting hole 80a for fitting the other end of the pushrod 47. A pressing pin 82 is interposed between the other end of the pushrod 47 and the bottom of the pushrod fitting hole 80a. The main shaft fitting portion 80 is provided so as to be axially movable within the hollow portion 42b, and the connecting member 55 moves outward in the axial direction when pressed by the pushrod 47.

The pressure disk connecting portion 81 is disposed with an outer peripheral portion thereof fitted to an inner ring 56b of the bearing 56, and axially presses the bearing 56 when a flange portion 81a protruding in the radial direction from the outer peripheral portion abuts on the inner ring 56b. The connecting member 55 and the pressure disk 52 are relatively rotatable with the bearing 56 interposed therebetween.

The pressure disk connecting portion 81 is provided with an oil introducing hole 83 that extends axially. The oil introducing hole 83 communicates with the outside of the multiplate clutch 40 through the oil take-in hole 71 of the pressure disk 52 and a space inside the inner ring 56b.

The connecting member 55 is provided with a plurality of oil holes 84 that allow the oil introducing hole 83 to communicate with the outside in the radial direction of the connecting member 55. The oil holes 84, in the axial direction, are formed at a position communicating with a space between the bearing 56 and the leading end surface of the clutch supporting shaft portion 42a.

The pressure disk 52 is installed on the clutch center 51 by inserting the boss portions 64 of the clutch center 51 into the boss insertion holes 76, and the coil springs 54 are each elastically installed between the washer 65a and the inside seat 77 under a predetermined initial load.

In the state shown in FIG. 4, the pressure disk 52 holds the clutch plate 53 with the pressure of the coil springs 54, and the clutch center 51 and the clutch outer 50 are connected by the frictional force occurring in the clutch plate 53. That is, in the state of FIG. 4, the clutch is in an engaged state, and the clutch outer 50 and the clutch center 51 rotate integrally.

Furthermore, when the pushrod 47 is operated so as to move outward in the axial direction of the multiplate clutch 40, the pressure disk 52 moves outward against the biasing force of the coil springs 54, so that the clutch is disengaged.

As shown in FIG. 3, the oil supply piece 38b extends through the oil take-in hole 71 into the oil introducing hole 83 of the connecting member 55.

Referring to FIGS. 4, 6, and 7, oil L introduced into the oil introducing hole 83 from the oil supply piece 38b flows through the oil holes 84 into a space between the clutch center 51 and the pressure disk 52 while passing along the wall surface in the multiplate clutch 40, and flows outward in the radial direction of the multiplate clutch 40 by the centrifugal force due to the rotation of the multiplate clutch 40 and is taken into the spring housing portions 75 of the spring receiving portions 74 from the supply holes 78. Here, since the width W1 of the supply hole 78 is larger than the width W3 of the gap 57, a larger amount of the oil L than the oil flowing into the gap 57 can be efficiently taken into the supply hole 78.

Then the oil L in the spring housing portions 75 is discharged outwardly of the spring receiving portions 74 from the discharge holes 79 by centrifugal force, and adheres to the portion of the inside cylindrical portion 62 of the clutch center 51 toward the inside in the axial direction of the multiplate clutch 40, and flows into the clutch plate 53 from this portion through the axially-aligned communication holes 62b. That is, the oil L discharged from the discharge holes 79, firstly, flows partially into the communication hole 62b1 located on the innermost side in the axial direction and then the rest flows into the other communication holes 62b located outward in the axial direction. In this embodiment, since the edge portion 79b of the discharge hole 79 is located more inward in the axial direction of the multiplate clutch 40 than the intermediate portion M of the thickness of the clutch plate 53, it is possible to efficiently supply the oil L to the clutch plate 53 located inward in the axial direction than the intermediate portion M. Although the innermost outside friction plate 53a1 has a smaller inner diameter and volume than the other outside friction plates 53a and is also smaller in heat capacity, according to this embodiment, it is possible to efficiently supply the oil L to the clutch plate 53 located on the inside in the axial direction of the multiplate clutch 40, and therefore the outside friction plate 53a1 can be efficiently cooled and lubricated.

Furthermore, since most of the oil entering the spring housing portion 75 and flowing outward in the vehicle width direction (outward in the axial direction of the multiplate clutch 40) is blocked by the washer 65a, it is possible to efficiently introduce the oil to the discharge hole 79 located inward in the vehicle width direction (inward in the axial direction of the multiplate clutch 40).

Moreover, since the partition ribs 67 are provided on both sides of the communication holes 62b, it is possible to collect the oil L in the communication holes 62b and efficiently supply the oil L to the clutch plate 53.

Further, the communication holes 62b are provided in the clutch fitting portion 62a of the inside cylindrical portion 62 to which the inside friction plates 53b are fitted, and, in the clutch engaged state as shown in FIG. 4, are formed at positions overlapping the inner periphery of the inside friction plates 53b in the axial direction of the multiplate clutch 40. Thus, the oil L can be supplied in such a manner as to pass from the communication holes 62b through the inside friction plates 53b, thereby allowing efficient supply of the oil L to the clutch plate 53.

As described above, according to the embodiment to which the present invention is applied, the multiplate clutch 40 is a multiplate clutch in which the frictional clutch plate 53 is engaged/disengaged by the pressure disk 52. The pressure disk 52 has the oil take-in hole 71. The clutch plate 53 is supplied with the oil L supplied to the inside surface side of the pressure disk 52 through the oil take-in hole 71. The pressure disk 52 is formed with the plurality of spring receiving portions 74 for mounting the coil springs 54 that are elastically installed between the pressure disk 52 and the clutch center 51, the spring receiving portions 74 being aligned circumferentially on the outside in the radial direction with respect to the oil take-in hole 71. Each of the spring receiving portions 74 is provided with the supply hole 78 in a side surface thereof toward the inside in the radial direction of the pressure disk 52, the supply hole 78 introducing into the spring receiving portion 74 the oil L supplied from the oil take-in hole 71. The spring receiving portion 74 is formed with the discharge hole 79 in a leading end portion thereof toward the outside in the radial direction of the pressure disk 52, the discharge hole 79 discharging to the outside the oil L introduced in the spring receiving portion 74. The inside cylindrical portion 62 serving as a side surface portion of the clutch center 51 is formed with the communication holes 62b communicating with the outside in the radial direction. Thus, the oil L supplied to the inside surface side of the pressure disk 52 through the oil take-in hole 71 is moved outward in the radial direction by centrifugal force. Part of the oil L enters the inside of the spring receiving portion 74 through the supply hole 78 and flows outwardly in the radial direction from the discharge hole 79 in the leading end portion of the spring receiving portion 74, and passes through the communication holes 62b of the clutch center 51 into the clutch plate 53 located on the inside in the axial direction of the multiplate clutch 40. It is therefore possible to efficiently supply the oil L to the clutch plate 53 located on the inside in the axial direction, and to effectively lubricate and cool the clutch plate 53.

Furthermore, the leading end of the spring receiving portion 74 is formed with the inside seat 77 that receives the leading end portion of the coil spring 54, and the discharge hole 79 is also formed in the inside seat 77. Thus, the oil L is allowed to flow from the leading end side of the spring receiving portion 74, thereby allowing the efficient supply of the oil L to the clutch plate 53 located on the inside in the axial direction.

Moreover, the discharge hole 79 is molded by a mold with the demolding direction coinciding with the axial direction. Thus, it is possible to easily form the discharge hole 79 without the need for machining.

Further, the edge portion 79b of the discharge hole 79 toward the outside in the axial direction of the multiplate clutch 40 is disposed more inward in the axial direction of the multiplate clutch 40 than the intermediate portion M of the thickness of the clutch plate 53. Thus, it is possible to supply the oil L from the discharge hole 79 to the inner side in the axial direction of the multiplate clutch 40 than the intermediate portion M of the thickness of the clutch plate 53, thereby allowing the efficient supply of the oil L to the clutch plate 53 located on the inside in the axial direction.

Additionally, the width W1 of the supply hole 78 is larger than the width W3 of the gap 57 between the adjacent spring receiving portions 74. Thus, it is possible to efficiently introduce the oil L into the spring receiving portion 74 through the supply hole 78.

It is understood that the invention is not limited to the above-mentioned embodiments. Various design changes can be made without departing from the spirit and scope of the invention, which is defined by the appended claims.

REFERENCE SIGNS LIST

40 . . . Multiplate clutch
51 . . . Clutch center
52 . . . Pressure disk
53 . . . Clutch plate
54 . . . Coil spring
57 . . . Gap
62 . . . Inside cylindrical portion (side surface portion of clutch center)
62b . . . Communication hole
71 . . . Oil take-in hole
74 . . . Spring receiving portion
77 . . . Inside seat (seating face)
78 . . . Supply hole
79 . . . Discharge hole
79b . . . Edge portion (Outside edge portion)
M . . . Intermediate portion
W1 . . . Width (width of supply hole)
W3 . . . Width (width of gap)

The invention claimed is:

1. A multiplate clutch, comprising a frictional clutch plate configured to be engaged and disengaged by a pressure disk;
wherein the pressure disk has an oil take-in hole,
wherein the frictional clutch plate is configured to be supplied with oil supplied to an inside surface side of the pressure disk through the oil take-in hole,
wherein the pressure disk comprises a plurality of spring receiving portions for mounting coil springs that are elastically installed between the pressure disk and a clutch center, the spring receiving portions being aligned circumferentially on an outside in a radial direction with respect to the oil take-in hole,
wherein each of the spring receiving portions is provided with a supply hole in a side surface portion thereof toward the inside in the radial direction of the pressure disk, the supply hole being configured to introduce into the spring receiving portion the oil supplied from the oil take-in hole, the spring receiving portion including a discharge hole in a leading end portion thereof toward the outside in the radial direction of the pressure disk, wherein the discharge hole is formed from a base end portion of the spring receiving portion to a boss insertion hole, and wherein the discharge hole is configured to discharge to the outside the oil introduced in the spring receiving portion; and wherein a side surface portion of the clutch center includes communication holes communicating with the inside in the radial direction.

2. The multiplate clutch according to claim 1, wherein the leading end of the spring receiving portion comprises a seating face that receives a leading end portion of the coil spring, and the discharge hole is formed in the seating face.

3. The multiplate clutch according to claim 2, wherein the discharge hole is molded by a mold with a demolding direction that is in an axial direction.

4. The multiplate clutch according to claim 1, wherein an edge portion of the discharge hole toward the outside in the axial direction of the multiplate clutch is disposed more inward in the axial direction of the multiplate clutch than an intermediate portion of a thickness of the clutch plate.

5. The multiplate clutch according to claim 1, wherein a width of the supply hole is larger than a width of a gap between adjacent spring receiving portions.

6. A multiplate clutch, comprising:
   clutch plate means for transmitting rotational force;
   pressure disk means for engaging and disengaging the clutch plate means, the pressure disk means including oil take-in means for supplying oil to the clutch plate means, said oil being supplied to an inside surface side of the pressure disk means,
   wherein the pressure disk means comprises spring receiving means for mounting spring means therein, said spring means being elastically installed between the pressure disk means and a clutch center, the spring receiving means being aligned circumferentially on an outside in a radial direction with respect to the oil take-in means,
   wherein each of the spring receiving means includes supply hole means in a side surface portion thereof toward the inside in the radial direction of the pressure disk means, the supply hole means for introducing into the spring receiving means the oil supplied from the oil take-in means, the spring receiving means including discharge means in a leading end portion thereof toward the outside in the radial direction of the pressure disk means, wherein the discharge means are formed from a base end portion of the spring receiving means to boss insertion means, and wherein the discharge means for discharging to the outside the oil introduced in the spring receiving means, and
   wherein a side surface portion of the clutch center includes communication means for communicating with the inside in the radial direction.

7. The multiplate clutch according to claim 6, wherein the leading end of the spring receiving means comprises seating means for receiving a leading end portion of the spring means, and wherein the discharge means is disposed in the seating means.

8. The multiplate clutch according to claim 7, wherein the discharge means is molded by a mold with a demolding direction that is in an axial direction.

9. The multiplate clutch according to claim 6, wherein an edge portion of the discharge means toward the outside in the axial direction of the multiplate clutch is disposed more inward in the axial direction of the multiplate clutch than an intermediate portion of a thickness of the clutch plate means.

10. The multiplate clutch according to claim 6, wherein a width of the supply means is larger than a width of a gap between adjacent spring receiving means.

* * * * *